United States Patent Office 3,009,499
Patented Nov. 21, 1961

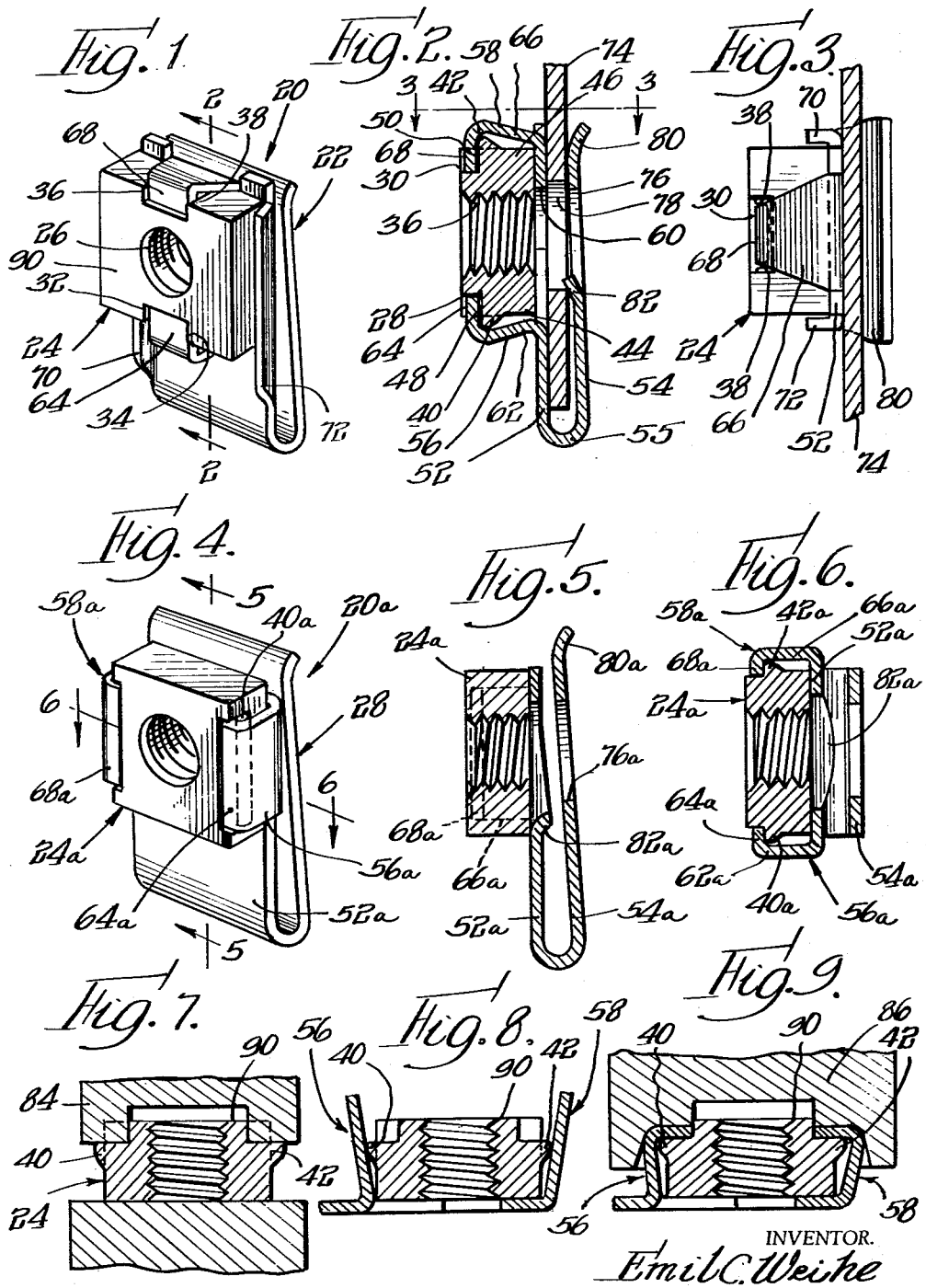

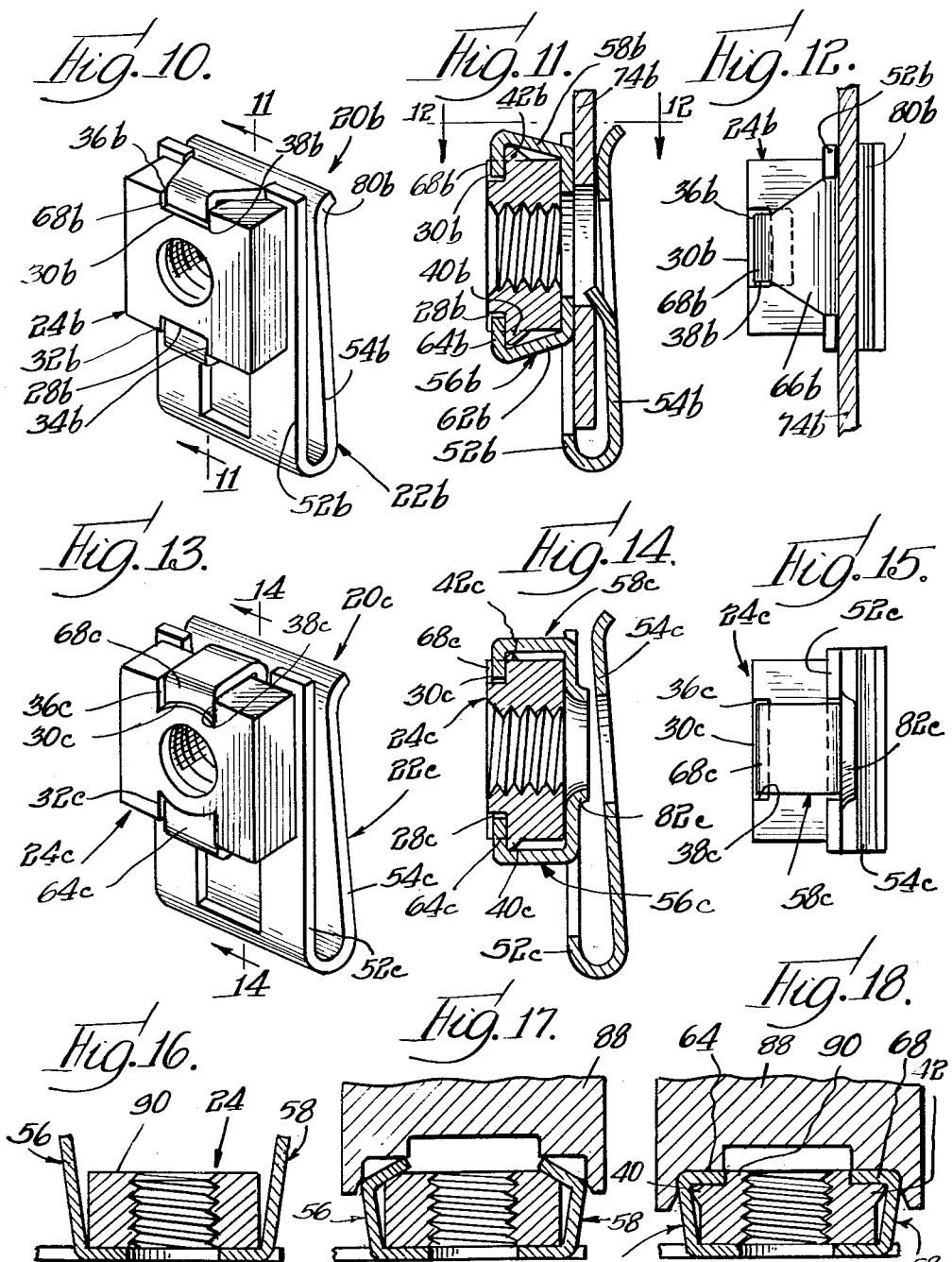

3,009,499
NUT WITH SWAGED NOTCHES AND RETAINER WITH PORTIONS RECEIVED IN THE NOTCHES
Emil C. Weihe, Des Plaines, Ill., assignor to Illinois Tool Works, Chicago, Ill., a corporation of Illinois
Filed Dec. 24, 1956, Ser. No. 630,270
6 Claims. (Cl. 151—41.75)

The present invention relates to a novel fastener unit, and more particularly to a novel threaded fastener member such as a nut and a novel retainer for holding the fastener member and adapted to be mounted on a workpiece or panel.

An important object of the present invention is to provide a novel fastener member such as a nut and a novel retainer therefor which are constructed so that they may be interconnected with each other easily and more economically and also more securely than heretofore proposed nut members and retainers of the general type contemplated herein.

A more specific object of the present invention is to provide a novel nut member and retainer which are constructed so that a pair of simple opposed elements of the retainer effectively serve to secure the nut member against rotation relative to the retainer and against lateral and axial displacement in all directions with respect to the retainer.

Still another object of the present invention is to provide a novel retainer of the above described type which may be easily and economically formed from sheet material and easily and securely applied over the margin of an apertured workpiece or panel.

A further object of the present invention is to provide a novel fastener or nut member of the above described type which may be easily and economically formed from a nut member of known presently available construction.

Other objects and advantages of the present invention will become apparent from the following description and the accompanying drawings, wherein:

FIG. 1 is a perspective view showing a nut member and retainer unit incorporating the features of the present invention;

FIG. 2 is a sectional view of the fastener unit taken along line 2—2 in FIG. 1 and further shows the unit applied to an apertured panel or workpiece;

FIG. 3 is a sectional view taken along line 3—3 in FIG. 2;

FIG. 4 is a perspective view showing a modified form of the present invention;

FIG. 5 is a sectional view taken along line 5—5 in FIG. 4;

FIG. 6 is a cross sectional view taken along line 6—6 in FIG. 4;

FIGS. 7, 8 and 9 are fragmentary sectional views showing one method of forming the nut member and applying the nut member to the retainer;

FIG. 10 is a perspective view showing another modified form of the present invention;

FIG. 11 is a sectional view taken along line 11—11 in FIG. 10 and further showing the fastener unit applied to an apertured workpiece or panel;

FIG. 12 is a sectional view taken along line 12—12 in FIG. 11;

FIG. 13 is a perspective view showing another slightly modified form of the present invention;

FIG. 14 is a sectional view taken along line 14—14 in FIG. 13;

FIG. 15 is an end view of the unit shown in FIG. 13; and

FIGS. 16, 17 and 18 are fragmentary sectional views showing another method of assembling the nut member with the retainer.

Referring now more specifically to the drawings wherein like parts are designated by the same numerals throughout the various figures, a unit 20 incorporating the features of the present invention is shown in FIGS. 1–3. This unit includes a sheet material retainer 22 preferably formed from resilient sheet metal and a threaded fastener or nut member 24. The nut member is provided with a central threaded aperture 26 and has a polygonal peripheral configuration which in the preferred embodiments shown herein is square. Notches or recesses 28 and 30 are swaged in upper opposite marginal portions of the nut member body for receiving elements of the retainer in the manner described below. It is to be noted that these notches are formed entirely between the opposite ends of their respective nut member marginal portions so that opposite ends of the notches are respectively defined by abutment surfaces 32—34 and 36—38. It is further important to note that the material swaged from the notches 28 and 30 respectively provide integral abutments or shelves 40 and 42 projecting laterally outwardly from the adjacent side surfaces 44 and 46 of the nut member so as to combine with the bottom surfaces of the notches to provide axially outwardly facing shelf surfaces 48 and 50. As shown best in FIG. 2, the shelf surfaces 48 and 50 have a width transversely of their respective adjacent nut member margins which is similar to the cross sectional thickness of the nut member wall between the aperture 26 and either the outer surface 44 or the outer side surface 46 for facilitating more secure engagement with elements of the retainer which is to be described in detail below. At the same time, the width of the notches transversely of their adjacent nut member margins is not substantially greater than one-half the above mentioned thickness of the nut member wall between the central aperture and the side surfaces so that the strength of the outer end of the nut member is not materially impaired.

The sheet material retainer 22 is provided with a generally U-shaped body having initially converging leg portions 52 and 54 joined by a bight portion 55. In order to retain the nut member in assembled relationship with the retainer, finger elements 56 and 58 extend laterally from the plane of the leg portion 52. The element 56 is struck entirely from within the periphery of the leg portion 52 and, in this embodiment, from an area of the leg portion 52 which will be substantially covered by the nut member, a portion of which area is simultaneously or subsequently formed to provide an aperture 60 which will be axially aligned with the nut member aperture for permitting the insertion of a complementary threaded member or bolt therein. The element 56 has a first section 62 which flares away from the element 58 and the nut member so as to extend around the lateral projection or shelf 40, and a reversely extending outer end section 64 substantially parallel to the plane of the leg portion 52 and overlying the shelf surface 48. The section 64 extends for substantially the full length and width of the notch 28 so as to have full engagement with the shelf surface 48 for maximum interlocking action. It is also important to note that the abutment surfaces 32 and 34 at the opposite ends of the notch 28 are substantially in engagement with the opposite side edges of the section 64 so that the section 64 also serves to preclude lateral displacement of the nut member from between the elements 56 and 58. The element 58 is similar to the element 56 but includes a relatively broad and outwardly tapering section 66 extending from an integral junction with an outer end portion of the leg 52, and a reversely folded section 68 which is narrower than the base section 66. The section 68 extends substantially fully over the shelf surface 50 and is engageable with the abutment surfaces 36 and 38 of the notch 30 for further securing the nut member against both axial displacement and lateral displacement. If desired, narrow rigidifying flanges 70 and 72 may be provided along opposite side edges of the retainer leg portion 52.

The generally U-shaped retainer is adapted to be slipped over a margin of a workpiece or panel 74 so that the apertures of the nut member and leg portion 52 and an aperture 76 in the leg portion 54 will be substantially axially aligned with an aperture 78 in the workpiece. A free end portion 80 of the leg 54 is flared outwardly to facilitate spreading of the legs 52 and 54 for assembly with the workpiece. While the legs 52 and 54 will resiliently grip the workpiece 74, it is desirable to provide means for positively preventing displacement of the retainer with respect to the workpiece. In this embodiment, an internal marginal portion of the leg 54 partially defining the aperture 76 is extruded or deflected toward the leg 52 to provide a projection 82 adapted to extend into the workpiece aperture 78 and engage an edge thereof for preventing displacement of the retainer.

In FIGS. 4–6 another embodiment of the present invention is shown, which embodiment is similar to the above described structure as indicated by the application of identical reference numerals with the suffix a added to corresponding elements. This embodiment differs primarily in that the nut retaining elements 56a and 58a extend from integral junctions with opposite side edges of the retainer leg portion 52a. This arrangement enables the transverse width of the elements 56a and 58a to be increased for added strength and even more secure retention of the nut member without decreasing the strength of the retainer leg portion 52a. Also in this embodiment the projection or extrusion 82a is formed in the retainer leg portion 52a rather than in the leg portion 54a.

In FIGS. 7–9, one method of producing the fastener unit of the present invention is shown. While the nut member and retainer shown in FIGS. 7–9 corresponds to those shown in FIGS. 1–3 it is to be understood that the method may be used for producing any of the fastener units disclosed herein. In FIG. 7 there is shown the manner in which the notches and laterally projecting shelves are swaged by means of a suitable tool 84 which may be mounted on a punch press or known construction, not shown. After the notches have been formed in the nut member, the nut member is placed on the retainer between the elements 56 and 58 before the outer end sections of the elements have been reversely folded as is shown in FIG. 8. Then, as shown in FIG. 9, the outer end sections of the elements 56 and 58 are engaged by a tool 86 mounted in a suitable punch press, not shown, and folded inwardly and downwardly against the shelf surfaces.

FIGS. 10–12 show another embodiment of the present invention which is similar to the above described structure as indicated by the application of identical reference numerals with the suffix b added to corresponding elements. This embodiment differs from the unit 20 in that the nut retaining element 56b is struck from an area of the leg portion 52b which is not to be covered by the nut member. This facilitates the formation of the element 56b since the section 62b thereof need be folded from the plane of the leg portion 52b through an angle of less than 90° while the corresponding element 56 described above is folded through an angle of more than 90°.

FIGS. 13–15 show a unit 20c which is similar to the unit 20b. In this embodiment the projection 82c is integral with the leg portion 52c and is in the form of an annular extrusion. The projection 82c is adapted to extend into a workpiece aperture so as to restrain lateral shifting of the unit with respect to the workpiece in all directions. Also in this form, the recesses are formed so that their inner edges are arcuately shaped and the ends of the sections 64c and 68c are provided with a complementary curved shape. This further increases the area of engagement between the sections 64c and 68c and the bottoms of the recesses without decreasing the minimum wall thickness between the recesses and the central aperture. It will be appreciated that this feature may also be incorporated into the other embodiments disclosed herein if desired.

FIGS. 16–18 illustrate another method of producing the fastener units in accordance with the present invention. The nut member and fastener shown in these figures again correspond to the nut member and fastener of FIGS. 1–3, but it is to be understood that the fastener unit of any of the embodiments disclosed herein may be produced in accordance with this method. With this method, the nut member 24 is placed between upstanding elements 56 and 58 of the retainer before the notches have been swaged therein as shown in FIG. 16. Then, as shown in FIG. 17, a tool 88 is forced against the end sections of the elements 56 and 58 and not only fold the end sections over the upper margins of the nut member but also forces the end sections into the nut member body to begin the swaging of the notches. Further movement of the tool 88 completes the folding of the elements 56 and 58 and also completes the swaging of the notches and the laterally projecting shelves as shown in FIG. 18. This embodiment of the method has the advantage of eliminating separate steps of swaging the notches and folding the ends of the elements 56 and 58. Furthermore, the resulting fastener unit has a structural advantage in that a force fit is provided between the end sections 64 and 68 of the elements 56 and 58 and the walls of the notches so that any possible movement between the nut member and the retainer is completed precluded. Furthermore, the aggressive frictional engagement between the wall of the notches and the end sections 64 and 68 materially adds to the inherent strength of the retainer material in preventing unauthorized outward deflection of the end sections 64 and 68 which would permit the nut member to escape. It is to be noted that in the structure provided by this method as well as the structure provided by the above described method, the notches are formed to a depth or in other words so that the shelf surfaces are axially spaced from an outer end surface 90 of the nut member a distance at least as great as the thickness of the retainer material. As a result, the end sections 64 and 68 are recessed in the notches so that their terminal edges are not exposed in a manner which might permit them to snag and injure a workman.

While the preferred embodiments of the present invention have been shown and described herein, it is obvious that many structural details may be changed without departing from the spirit and scope of the appended claims.

The invention is claimed as follows:

1. A unit comprising a threaded polygonal fastener body having substantially flat side surfaces, and a one-piece sheet material retainer, said retainer including a portion for overlying one side of a workpiece when the retainer is assembled with a workpiece, a pair of spaced generally opposed elements integral with and extending laterally outwardly from said retainer portion, said body being disposed between said elements and having an axially inwardly facing surface substantially abutting said retainer portion, junctions between said elements and said retainer portion being adjacent and substantially parallel to generally opposite side surfaces of said body, a pair of notch means respectively swaged in generally opposite outer end marginal portions of said body adjacent said elements and intermediate opposite ends of said marginal portions, said body having corner portions providing pairs of abutment surfaces respectively defining opposite ends of said pair of notch means, shelf portions integral with said body and formed from material swaged from said pair of notch means and projecting laterally outwardly from side surfaces and adjacent abutment providing corner portions of said body, said shelf portions combining with bottom surfaces of said notch means to provide relatively wide generally axially outwardly facing shelf surfaces spaced axially inwardly a predetermined distance from an outer end surface of said body, and said elements extending from said junctions around said shelf portions and including sections respectively overlying said shelf surfaces and projecting into said notch means for engagement with said abutment surfaces for restraining axial and lateral displacement of the body from between said elements, said sections extending into said notch means with a force fit and having opposite side edges aggressively abutting and conforming intimately to said abutment surfaces.

2. A unit, as defined in claim 1, wherein said retainer comprises a leg portion disposed in opposing relationship with respect to said first mentioned portion so that said opposing portions are adapted to grip a workpiece therebetween, and a projection extending from one of said opposing portions for entering an aperture in a workpiece for restraining lateral displacement of the retainer with respect to a workpiece when the retainer is fully assembled with the workpiece.

3. A unit, as defined in claim 1, wherein said fastener body is a nut body having a central axially extending internally threaded bore, each of said notch means having a transverse width not substantially greater than one-half of a thickness of a nut member wall between said bore and a peripheral side surface of the nut member adjacent said notch means, each of said shelf surfaces having a transverse width similar to said wall thickness, and said sections extending for substantially the full width of said shelf surfaces.

4. A unit, as defined in claim 1, wherein said sections have a thickness not greater than said predetermined distance, terminal edges of said sections being disposed substantially entirely within said notch means.

5. In a unit, as defined in claim 1, wherein said threaded fastener body is a nut body having a central axially extending threaded aperture therethrough, said nut body having a pair of arcuate surfaces substantially concentric with said aperture and respectively defining portions of said pair of notch means and extending between the abutment surfaces of said notch means, said sections overlying said shelf surfaces respectively projecting substantially to said arcuate surfaces and having end edges complementary to said arcuate surfaces for increasing areas of engagement between said sections and said shelf surfaces.

6. A method of assembling a fastener body with a retainer having a pair of generally opposite disposed spaced apart elements extending from a portion thereof comprising positioning said body and said retainer together with an axially inwardly facing surface of said body abutting said retainer portion and said body disposed between said elements, then folding sections of said elements over generally opposite outer end marginal surface portions of said body intermediate opposite ends of said marginal surface portions, and then forcing said sections generally axially into said body and simultaneously swaging notches in said body with said retainer sections so that said retainer sections are ultimately positioned in said notches with a force fit.

References Cited in the file of this patent

UNITED STATES PATENTS

| | | |
|---|---|---|
| 1,915,245 | Cook | June 20, 1933 |
| 2,100,357 | Rosborough | Nov. 30, 1937 |
| 2,159,573 | Tinnerman | May 23, 1939 |
| 2,160,598 | Melrath | May 30, 1939 |
| 2,208,532 | Woodward | July 16, 1940 |
| 2,303,148 | Tinnerman | Nov. 24, 1942 |
| 2,377,114 | Tomalis | May 29, 1945 |
| 2,448,902 | McKenzie | Sept. 7, 1948 |
| 2,633,886 | Tinnerman | Apr. 7, 1953 |
| 2,658,546 | Crowther | Nov. 10, 1953 |
| 2,684,703 | Crowther | July 27, 1954 |